(12) United States Patent
Fan (10) Patent No.: US 10,313,643 B2
(45) Date of Patent: Jun. 4, 2019

(54) IMAGING SYSTEM HAVING FOUR IMAGE SENSORS

(71) Applicant: OmniVision Technologies, Inc., Santa Clara, CA (US)

(72) Inventor: Chun-Sheng Fan, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 38 days.

(21) Appl. No.: 15/456,937

(22) Filed: Mar. 13, 2017

(65) Prior Publication Data

US 2018/0262725 A1   Sep. 13, 2018

(51) Int. Cl.
| | |
|---|---|
| H04N 9/097 | (2006.01) |
| H04N 9/76 | (2006.01) |
| H04N 5/225 | (2006.01) |
| H04N 5/33 | (2006.01) |
| G02B 27/10 | (2006.01) |
| G02B 27/14 | (2006.01) |
| G02B 13/00 | (2006.01) |
| H04N 9/04 | (2006.01) |
| H04N 5/369 | (2011.01) |

(52) U.S. Cl.
CPC ......... *H04N 9/097* (2013.01); *G02B 27/1013* (2013.01); *G02B 27/141* (2013.01); *G02B 27/146* (2013.01); *H04N 5/2258* (2013.01); *H04N 5/332* (2013.01); *H04N 5/36965* (2018.08); *H04N 9/045* (2013.01); *G02B 13/0085* (2013.01)

(58) Field of Classification Search
None
See application file for complete search history.

(56) References Cited

U.S. PATENT DOCUMENTS

| | | |
|---|---|---|
| 4,323,918 A | 4/1982 | Bendell |
| 7,671,907 B2 | 3/2010 | Kobayashi et al. |
| 8,988,564 B2 | 3/2015 | Webster et al. |
| 9,094,567 B2 | 7/2015 | Olson |
| 2003/0174928 A1* | 9/2003 | Huang ................. G02B 6/3512 385/18 |
| 2010/0265553 A1* | 10/2010 | Leopold ................... G03H 1/04 359/10 |
| 2012/0229606 A1* | 9/2012 | Rodrigue ............. G01B 11/245 348/46 |
| 2013/0208146 A1* | 8/2013 | Cotton ................. H04N 5/2254 348/239 |

(Continued)

*Primary Examiner* — Frederick D Bailey (57) ABSTRACT

An imaging system having four image sensors comprises a first dichroic filter, a second dichroic filter, and a third dichroic filter. The first dichroic filter reflects light having a first wavelength band and a second wavelength band toward a second dichroic filter, and transmits light having a third wavelength band and a fourth wavelength band toward the third dichroic filter. The second dichroic filter reflects light having the first wavelength band toward the first image sensor, and transmits light having the second wavelength band toward the second image sensor. The third dichroic filter reflects light having the third wavelength band toward the third image sensor, and transmits light having the fourth wavelength band toward the fourth image sensor. The first dichroic filter, the second dichroic filter, and the third dichroic filter are included in an integrated part.

15 Claims, 9 Drawing Sheets

(56) References Cited

U.S. PATENT DOCUMENTS

| | | | |
|---|---|---|---|
| 2014/0118584 A1* | 5/2014 | Lee | H04N 5/2254 348/262 |
| 2014/0254129 A1* | 9/2014 | Miyoshi | F21V 13/08 362/84 |
| 2014/0307072 A1* | 10/2014 | Takahashi | H04N 5/23296 348/65 |
| 2016/0216524 A1 | 7/2016 | Deng et al. | |

* cited by examiner

IMAGING SYSTEM HAVING FOUR IMAGE SENSORS

FIELD OF THE INVENTION

This invention relates to an imaging system, and more specifically relates to an imaging system having four image sensors.

BACKGROUND OF THE INVENTION

A color image sensor typically produces three primary color images. The three primary colors typically are red (R), green (G), and blue (B). Three primary color images are obtained after interpolations of images detected using a Bayer color filter array. Alternatively, three monochrome image sensors may be used to obtain three primary color images. No interpolation is needed. Each image sensor detects a primary color image without interpolation. Dichroic filters are typically used to selectively transmit or reflect a certain color, thus light having a specific color, either red, green, or blue, will arrive at and be detected by the monochrome image sensor. A monochrome image sensor is the same as a color image sensor without a color filter array covering light sensitive pixels.

In some applications, a fourth color or wavelength band may be required. For example, in a security camera, IR image detection is required for night vision. In another example, IR image detection is used for gesture recognition. In yet another example, an IR pixel is required for time-of-flight (TOF) detection. A TOF IR pixel may require specific circuit that is different from and more complex than regular circuits of RGB pixels. A TOF IR pixel is capable of detecting the distance from a target to the image sensor or the pixel. Consequently, implementing TOF IR pixels among RGB pixels in a single image sensor may not be straightforward. Accordingly, imaging systems having four image sensors are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

An imaging system having four image sensors is disclosed. The imaging system may be useful for gesture recognition, and also for security cameras that can detect visible scene in the day time and IR scene during the night. The imaging system will also be useful for easier implementation of TOF pixels for 3D imaging. In other words, TOF pixels are not implanted in RGB pixels. TOF pixels form a separate image sensor having TOF pixels only. The imaging system could be used to detect and later display a vivid image represented by four colors (e.g., red, green, blue, and yellow), which is better than an image represented by three primary colors only.

Figure 1:
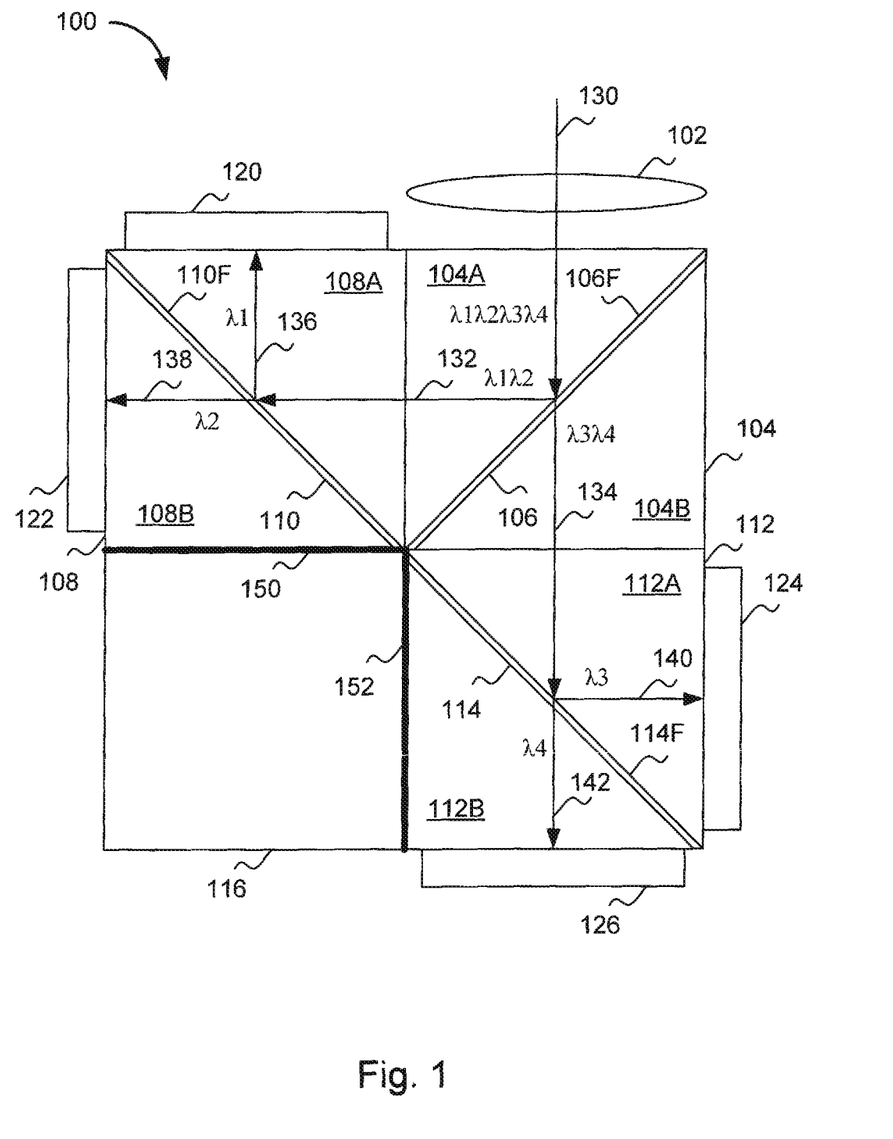
FIG. 1 illustrates an exemplary embodiment of imaging system having four image sensors comprising three beam splitter cubes, according to the present invention.

FIG. 1 illustrates an exemplary embodiment 100 of imaging system having four image sensors, according to the present invention. Embodiment 100 comprises an imaging lens 102, a first beam splitter cube 104 having a first dichroic filter 106F disposed on a diagonal plane 106 of first beam splitter cube 104. First beam splitter cube 104 includes two prisms 104A and 104B, diagonal plane 106 is the interface of two prisms 104A and 104B. Prisms 104A and 104B may be made of the same material.

An incident light 130 having a first wavelength band $\lambda 1$, a second wavelength band $\lambda 2$, a third wavelength band $\lambda 3$, and a fourth wavelength band $\lambda 4$, passes through imaging lens 102, and enters to first beam splitter cube 104. Light 132, which is part of incident light 130, having first wavelength band $\lambda 1$ and second wavelength band $\lambda 2$, is reflected by first dichroic filter 106F to enter a second beam splitter cube 108. Light 134, which is part of incident light 130, having third wavelength band $\lambda 3$ and fourth wavelength band $\lambda 4$, is transmitted through first dichroic filter 106F to enter a third beam splitter cube 112.

Light 132 entering second beam splitter cube 108 is split into light 136 and light 138. Light 136 having first wavelength band $\lambda 1$ is reflected by a second dichroic filter 110F disposed on a diagonal plane 110 of second beam splitter cube 108 toward a first image sensor 120. Diagonal plane 110 is perpendicular to diagonal plane 106. Second beam splitter cube 108 includes two prisms 108A and 108B, diagonal plane 110 is the interface of two prisms 108A and 108B. Prisms 108A and 108B may be made of the same material. Light 138 having second wavelength band $\lambda 2$ is transmitted through second dichroic filter 110F toward a second image sensor 122.

Light 134 entering third beam splitter cube 112 is split into light 140 and light 142. Light 140 having third wavelength band $\lambda 3$ is reflected by a third dichroic filter 114F disposed on a diagonal plane 114 of third beam splitter cube 112 toward a third image sensor 124. Diagonal plane 114 is perpendicular to diagonal plane 106. Third beam splitter cube 112 includes two prisms 112A and 112B, diagonal plane 114 is the interface of two prisms 112A and 112B. Prisms 112A and 112B may be made of the same material. Light 142 having fourth wavelength band $\lambda 4$ is transmitted through third dichroic filter 114F toward a fourth image sensor 126.

First, second, and third beam splitter cubes are preferably having the same size and made of the same material. Accordingly, prisms 104A, 104B, 108A, 108B, 112A, and 112B are made of the same material. Second beam splitter cube 108 may be directly attached to a side of first beam splitter cube 104. Third beam splitter cube 112 may be directly attached to another side of first beam splitter cube 104 forming an L-shaped integrated part. The L-shaped integrated part may have no space between the first and second beam splitter cubes, and no space between the first and third beam splitter cubes. In this manner, first dichroic filter 106F, second dichroic filter 110F, and third dichroic filter are included in the L-shaped integrated part. First dichroic filter 106F, second dichroic filter 110F, and third dichroic filter may be multi-layer interference filters.

In an embodiment, a cube 116 having the same size as first, second, and third beam splitter cubes is disposed at the corner between second and third beam splitter cubes of the L-shaped integrated part forming an integrated cube. Optionally, the integrated cube may have a first black coating 150 between second beam splitter cube 108 and cube 116, and a second black coating 152 between third beam splitter cube 112 and cube 116. Cube 116 may or may not be a beam splitter cube. Cube 116 may be made of the same material as beam splitter cubes 104, 108, and 112. It is appreciated that cube 116 is optional.

First image sensor 120 is mounted on prism 108A of second beam splitter cube 108, second image sensor 122 is mounted on prism 108B of second beam splitter cube 108, third image sensor 124 is mounted on prism 112A of third beam splitter cube 112, and fourth image sensor 126 is mounted on prism 112B of third beam splitter cube 112. In an embodiment, the image sensor is mounted with a cover glass, in another embodiment, the image sensor is mounted without a cover glass.

In this manner, incident light 130 is split into: light 136 having first wavelength band $\lambda 1$ arriving at and detected by first image sensor 120, light 138 having second wavelength band $\lambda 2$ arriving at and detected by second image sensor 122, light 140 having third wavelength band $\lambda 3$ arriving at and detected by third image sensor 124, and light 142 having fourth wavelength band $\lambda 4$ arriving at and detected by fourth image sensor 126. Lengths of light paths from imaging lens 102 to first image sensor 120, second image sensor 122, third image sensor 124, and fourth image sensor 126 are the same.

Imaging lens 102 forms a 2D image of first wavelength band $\lambda 1$ on first image sensor 120, a 2D image of second wavelength band $\lambda 2$ on second image sensor 122, a 2D image of third wavelength band $\lambda 3$ on third image sensor 124, and a 2D image of fourth wavelength band $\lambda 4$ on fourth image sensor 126.

In an embodiment, first wavelength band $\lambda 1$ corresponds to blue (B) color, second wavelength band $\lambda 2$ corresponds to green (G) color, third wavelength band $\lambda 3$ corresponds to red (R) color, and fourth wavelength band $\lambda 4$ corresponds to infrared (IR). The detected R, G, and B images may be combined to make a visible image. The imaging system having fourth image sensors may provide a visible image and its corresponding IR image. In an embodiment, first, second, third, and fourth image sensors have no color filter to cover the image sensors. No color filter array covers the light sensitive pixels of the image sensor. In other embodiments, some color filters may cover the light sensitive pixels of the image sensor. Wavelength bands $\lambda 1$, $\lambda 2$, $\lambda 3$, $\lambda 4$ may or may not be in an order of B, G, R, IR. Any order or combination of B, G, R, IR is possible.

It is appreciated that first, second, third, and fourth wavelength bands may correspond to any color. For example, first wavelength band $\lambda 1$ corresponds to blue (B) color, second wavelength band $\lambda 2$ corresponds to green (G) color, third wavelength band $\lambda 3$ corresponds to red (R) color, and fourth wavelength band $\lambda 4$ corresponds to yellow (Y) color. Any order or combination of B, G, R, Y is possible.

Imaging lens 102 may be a group of lenses. In an embodiment, imaging lens 102 may be a wafer-level lens. A wafer-level lens may be singulated from a lens wafer. A lens wafer comprises a substrate and a plurality of replicated lenses on the substrate. It is appreciated that imaging lens 102 may be any lens or group of lenses, not limited by wafer-level lens, which is suitable to include in the imaging system having four image sensors.

Figure 2:
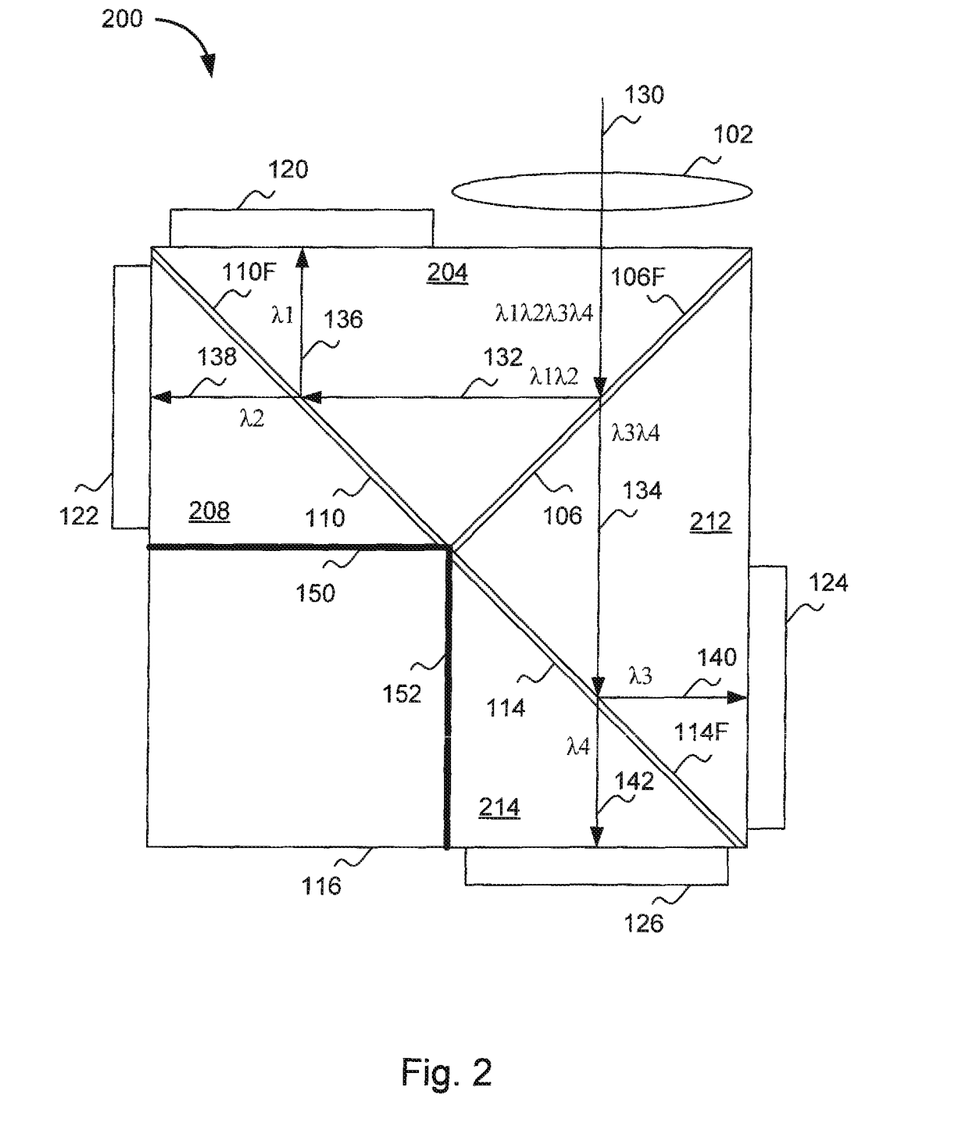
FIG. 2 illustrates an exemplary embodiment of imaging system having four image sensors comprising two prisms of the same size and two prisms of smaller size, according to the present invention.

FIG. 2 illustrates an exemplary embodiment 200 of imaging system having four image sensors, according to the present invention. Embodiment 200 comprises an imaging lens 102, a first prism 204, a second prism 212, a third prism 208, and a fourth prism 214. All prisms are preferably made of the same material. First prism 204 and second prism 212 have the same size. Third prism 208 and fourth prism 214 have a size, which is one half of first prism 204 or one half of second prism 212. A first dichroic filter 106F is disposed on an interface plane 106 of first prism 204 and second prism 212. A second dichroic filter 110F is disposed on an interface plane 110 of first prism 204 and third prism 208. A third dichroic filter 114F is disposed on an interface plane 114 of second prism 212 and fourth prism 214.

First prism 204, second prism 212, third prism 208, and fourth prism 214 form an L-shaped integrated part. The L-shaped integrated part may have no space between first prism 204 and second prism 212, no space between first prism 204 and third prism 208, and no space between second prism 212 and fourth prism 214. In this manner, first dichroic filter 106F, second dichroic filter 110F, and third dichroic filter are included in the L-shaped integrated part. First dichroic filter 106F, second dichroic filter 110F, and third dichroic filter may be multi-layer interference filters.

In an embodiment, a cube 116 having the same side length as the side lengths of third prism 208 and fourth prism 214 is disposed at the corner between third prism 208 and fourth prism 214 of the L-shaped integrated part forming an integrated cube. The integrated cube may optionally has a first black coating 150 between third prism 208 and cube 116, and a second black coating 152 between fourth prism 214 and cube 116. Cube 116 may be made of the same material as prisms 204, 208, 212, and 214. It is appreciated that cube 116 is optional.

An incident light 130 having a first wavelength band $\lambda 1$, a second wavelength band $\lambda 2$, a third wavelength band $\lambda 3$, and a fourth wavelength band $\lambda 4$, passes through imaging lens 102, and enters to first prism 204. Light 132, which is part of incident light 130, having first wavelength band $\lambda 1$ and second wavelength band $\lambda 2$, is reflected by first dichroic filter 106F toward third prism 208. Light 134, which is part of incident light 130, having third wavelength band $\lambda 3$ and fourth wavelength band $\lambda 4$, is transmitted through first dichroic filter 106F to enter a second prism 212.

Light 132 is split into light 136 and light 138. Light 136 having first wavelength band $\lambda 1$ is reflected by second dichroic filter 110F toward a first image sensor 120. Light 138 having second wavelength band $\lambda 2$ is transmitted through second dichroic filter 110F toward a second image sensor 122. Second dichroic filter 110F is perpendicular to first dichoric filter 106F.

Light 134 entering second prism 212 is split into light 140 and light 142. Light 140 having third wavelength band $\lambda 3$ is reflected by third dichroic filter 114F toward a third image sensor 124. Light 142 having fourth wavelength band $\lambda 4$ is transmitted through third dichroic filter 114F toward a fourth image sensor 126. Third dichroic filter 114F is perpendicular to first dichoric filter 106F.

First image sensor 120 is mounted on first prism 204, second image sensor 122 is mounted on third prism 208, third image sensor 124 is mounted on second prism 212, and fourth image sensor 126 is mounted on fourth prism 214. In an embodiment, the image sensor is mounted with a cover glass, in another embodiment, the image sensor is mounted without a cover glass.

In this manner, incident light 130 is split into: light 136 having first wavelength band $\lambda 1$ arriving at and detected by first image sensor 120, light 138 having second wavelength band $\lambda 2$ arriving at and detected by second image sensor 122, light 140 having third wavelength band $\lambda 3$ arriving at and detected by third image sensor 124, and light 142 having fourth wavelength band $\lambda 4$ arriving at and detected by fourth image sensor 126. Lengths of light paths from imaging lens 102 to first image sensor 120, second image sensor 122, third image sensor 124, and fourth image sensor 126 are the same.

Imaging lens 102 forms a 2D image of first wavelength band $\lambda 1$ on first image sensor 120, a 2D image of second wavelength band 72 on second image sensor 122, a 2D image of third wavelength band $\lambda 3$ on third image sensor 124, and a 2D image of fourth wavelength band $\lambda 4$ on fourth image sensor 126.

In an embodiment, first wavelength band $\lambda 1$ corresponds to blue (B) color, second wavelength band $\lambda 2$ corresponds to green (G) color, third wavelength band $\lambda 3$ corresponds to red (R) color, and fourth wavelength band $\lambda 4$ corresponds to infrared (IR). The detected R, G, and B images may be combined to make a visible image. The imaging system having fourth image sensors may provide a visible image and its corresponding IR image. In an embodiment, first, second, third, and fourth image sensors have no color filter to cover the image sensors. No color filter array covers the light sensitive pixels of the image sensor. In other embodiments, some color filters may cover the light sensitive pixels of the image sensor. Wavelength bands $\lambda 1$, $\lambda 2$, $\lambda 3$, $\lambda 4$ may or may not be in an order of B, G, R, IR. Any order or combination of B, G, R, IR is possible.

It is appreciated that first, second, third, and fourth wavelength bands may correspond to any color. For example, first wavelength band $\lambda 1$ corresponds to blue (B) color, second wavelength band $\lambda 2$ corresponds to green (G) color, third wavelength band $\lambda 3$ corresponds to red (R) color, and fourth wavelength band $\lambda 4$ corresponds to yellow (Y) color. Any order or combination of B, G, R, Y is possible.

Imaging lens 102 may be a group of lenses. In an embodiment, imaging lens 102 may be a wafer-level lens. A wafer-level lens may be singulated from a lens wafer. A lens wafer comprises a substrate and a plurality of replicated lenses on the substrate. It is appreciated that imaging lens 102 may be any lens or group of lenses, not limited by wafer-level lens, which is suitable to include in the imaging system having four image sensors.

Figure 3:
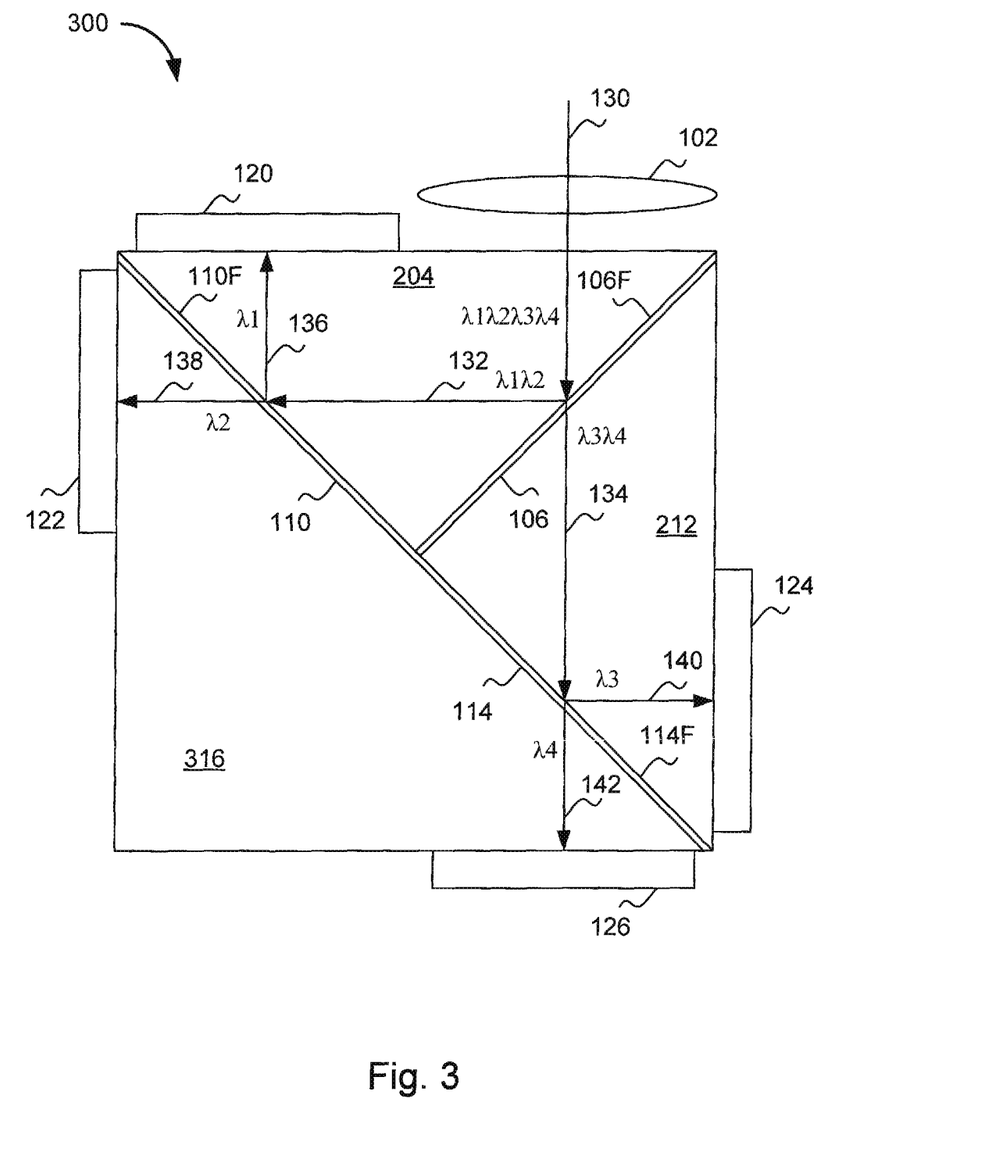
FIG. 3 illustrates an exemplary embodiment of imaging system having four image sensors comprising two prisms of the same size and a prism of larger size, according to the present invention.

FIG. 3 illustrates an exemplary embodiment 300 of imaging system having four image sensors, according to the present invention. Embodiment 300 of FIG. 3 is similar to embodiment 200 of FIG. 2. The difference of embodiment 300 from embodiment 200 is that third prism 208, fourth prism 214, and cube 116 of embodiment 200 is replaced by a single large prism 316 in embodiment 300. Large prism 316 has a size double the size of first prism 204 or double the size of second prism 212. A second dichroic filter 110F is disposed on an interface plane 110 of first prism 204 and large prism 316. A third dichroic filter 114F is disposed on an interface plane 114 of second prism 212 and large prism 316. Interface plane 110 and interface plane 114 form a planar plane. Similar to embodiments 100 and 200, second dichroic filter 110F is different from third dichroic filter 114F. A first dichroic filter 106F is disposed on an interface plane 106 of first prism 204 and second prism 212.

First prism 204, second prism 212, and large prism 316 form an integrated part, which may be a cube. First prism 204, second prism 212, and large prism 316 are preferably made of the same material. The integrated cube may have no space between first prism 204 and second prism 212, no space between first prism 204 and large prism 316, and no space between second prism 212 and large prism 316. In this manner, first dichroic filter 106F, second dichroic filter 110F, and third dichroic filter are included in the integrated part. First dichroic filter 106F, second dichroic filter 110F, and third dichroic filter may be multi-layer interference filters.

An incident light 130 having a first wavelength band $\lambda 1$, a second wavelength band $\lambda 2$, a third wavelength band $\lambda 3$, and a fourth wavelength band λ4, passes through imaging lens 102, and enters to first prism 204. Light 132, which is part of incident light 130, having first wavelength band λ1 and second wavelength band λ2, is reflected by first dichroic filter 106F toward large prism 316. Light 134, which is part of incident light 130, having third wavelength band λ3 and fourth wavelength band λ4, is transmitted through first dichroic filter 106F to enter second prism 212.

Light 132 is split into light 136 and light 138. Light 136 having first wavelength band λ1 is reflected by second dichroic filter 110F toward a first image sensor 120. Light 138 having second wavelength band λ2 is transmitted through second dichroic filter 110F toward a second image sensor 122. Second dichroic filter 110F is perpendicular to first dichoric filter 106F.

Light 134 entering second prism 212 is split into light 140 and light 142. Light 140 having third wavelength band λ3 is reflected by third dichroic filter 114F toward a third image sensor 124. Light 142 having fourth wavelength band λ4 is transmitted through third dichroic filter 114F toward a fourth image sensor 126. Third dichroic filter 114F is perpendicular to first dichoric filter 106F.

First image sensor 120 is mounted on first prism 204, second image sensor 122 is mounted on large prism 316, third image sensor 124 is mounted on second prism 212, and fourth image sensor 126 is mounted on third prism 316. In an embodiment, the image sensor is mounted with a cover glass, in another embodiment, the image sensor is mounted without a cover glass.

In this manner, incident light 130 is split into: light 136 having first wavelength band λ1 arriving at and detected by first image sensor 120, light 138 having second wavelength band λ2 arriving at and detected by second image sensor 122, light 140 having third wavelength band λ3 arriving at and detected by third image sensor 124, and light 142 having fourth wavelength band λ4 arriving at and detected by fourth image sensor 126. Lengths of light paths from imaging lens 102 to first image sensor 120, second image sensor 122, third image sensor 124, and fourth image sensor 126 are the same.

Imaging lens 102 forms a 2D image of first wavelength band λ1 on first image sensor 120, a 2D image of second wavelength band λ2 on second image sensor 122, a 2D image of third wavelength band λ3 on third image sensor 124, and a 2D image of fourth wavelength band λ4 on fourth image sensor 126.

Figure 4:
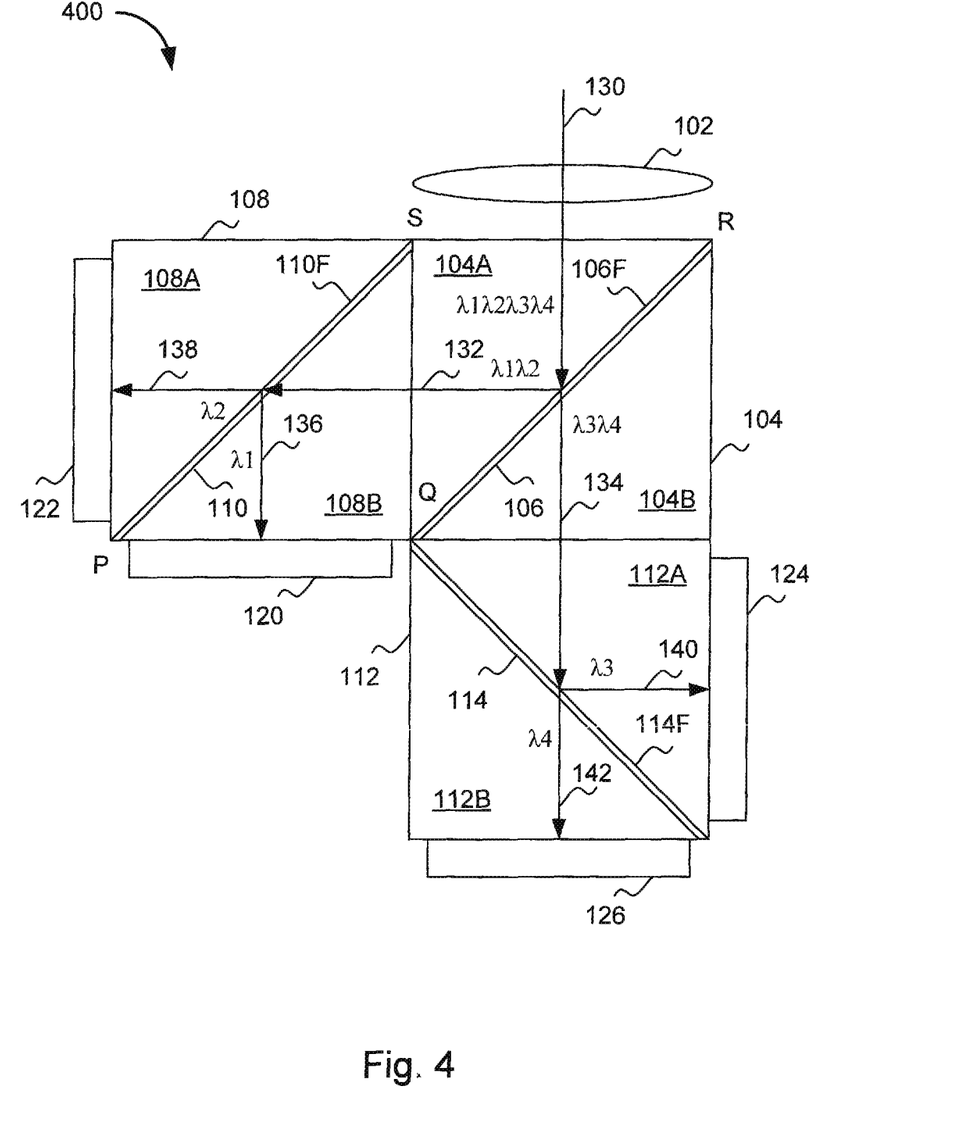
FIG. 4 illustrates another exemplary embodiment of imaging system having four image sensors comprising three beam splitter cubes, according to the present invention.

FIG. 4 illustrates an exemplary embodiment 400 of imaging system having four image sensors, according to the present invention. Embodiment 400 of FIG. 4 is similar to embodiment 100 of FIG. 1. The difference of embodiment 400 from embodiment 100 is that diagonal plane 110 is parallel to diagonal plane 106. Thus second dichroic filter 110F is parallel to first dichroic filter 106F. Accordingly, light 136 having first wavelength band λ1 is reflected by second dichroic filter 110F downward toward first image sensor 120. First image sensor 120 in embodiment 400 is disposed on the side of third beam splitter cube 108 away from imaging lens 102, while first image sensor 120 in embodiment 100 is disposed on the side of third beam splitter cube 108 close to image lens 102.

First, second, and third beam splitter cubes are preferably having the same size and made of the same material. Second beam splitter cube 108 may be directly attached to a side of first beam splitter cube 104. Third beam splitter cube 112 may be directly attached to another side of first beam splitter cube 104 forming an L-shaped integrated part. The L-shaped integrated part may have no space between the first and second beam splitter cubes, and no space between the first and third beam splitter cubes. In this manner, first dichroic filter 106F, second dichroic filter 110F, and third dichroic filter are included in the L-shaped integrated part. First dichroic filter 106F, second dichroic filter 110F, and third dichroic filter may be multi-layer interference filters.

Furthermore, first beam splitter cube 104 and second beam splitter cube 108 may be integrated to form a single part having first dichroic filter 106F and second dichroic filter 110F. Prism 104A of first beam splitter cube 104 is integrated with prism 108B of second beam splitter cube 108, no interface is between first beam splitter cube 104 and second beam splitter cube 108. In this manner, the same material would fill parallelogram PQRS, no interface is between prisms 104A and 108B.

First image sensor 120 is mounted on prism 108B of second beam splitter cube 108, second image sensor 122 is mounted on prism 108A of second beam splitter cube 108, third image sensor 124 is mounted on prism 112A of third beam splitter cube 112, and fourth image sensor 126 is mounted on prism 112B of third beam splitter cube 112. In an embodiment, the image sensor is mounted with a cover glass, in another embodiment, the image sensor is mounted without a cover glass.

Similar to embodiment 100 of FIG. 1, incident light 130 is split into: light 136 having first wavelength band λ1 arriving at and detected by first image sensor 120, light 138 having second wavelength band λ2 arriving at and detected by second image sensor 122, light 140 having third wavelength band λ3 arriving at and detected by third image sensor 124, and light 142 having fourth wavelength band λ4 arriving at and detected by fourth image sensor 126. Lengths of light paths from imaging lens 102 to first image sensor 120, second image sensor 122, third image sensor 124, and fourth image sensor 126 are the same.

Imaging lens 102 forms a 2D image of first wavelength band λ1 on first image sensor 120, a 2D image of second wavelength band λ2 on second image sensor 122, a 2D image of third wavelength band λ3 on third image sensor 124, and a 2D image of fourth wavelength band λ4 on fourth image sensor 126.

A wafer-level process may be employed to construct imaging system having four image sensors of embodiment 400. In an embodiment, first beam splitter cube 104 and second beam splitter cube 108 may be a pair of wafer level beam splitter cubes singulated from a beam splitter cube wafer. For example, a polarizing beam splitter wafer and its method of manufacturing are disclosed in U.S. patent application Ser. No. 14/605,554 filed Jan. 26, 2015, which is assigned to the assignee of the current application. A wafer of beam splitter cubes having same dichroic filters and its method of manufacturing are disclosed in U.S. patent application Ser. No. 15/408,724 filed Jan. 18, 2017, which is of the same inventor and assigned to the assignee of the current application. Accordingly, both U.S. patent application Ser. Nos. 14/605,554 and 15/408,724 are incorporated by reference herein. A polarizing beam splitter transmits light having a first polarization and reflects light having a second polarization, where the first polarization and the second polarization are orthogonal. On the other hand, a beam splitter cube having a dichroic filter transmits light of certain color bands and reflects light of all colors outside the color bands. The beam splitter cube wafer in this disclosure includes two different dichroic filters.

Figures 5A, 5B:
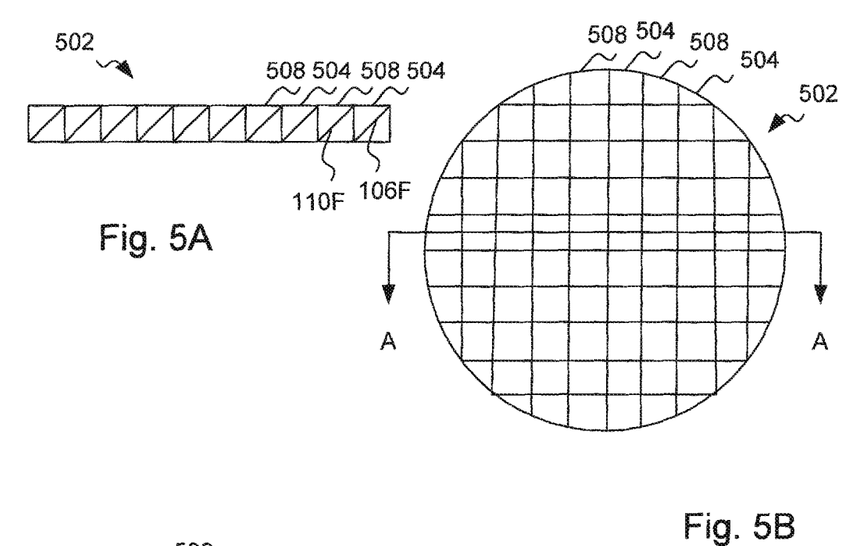
FIG. 5A illustrates a cross-section of an exemplary beam splitter cube wafer, according to the present invention.
FIG. 5B illustrates a top view of the exemplary beam splitter cube wafer, according to the present invention.
Figure 5C:
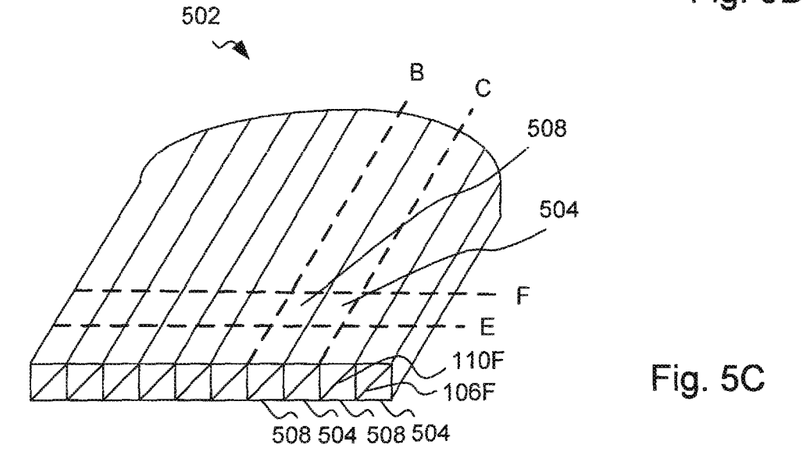
FIG. 5C illustrates a perspective view of the exemplary beam splitter cube wafer, according to the present invention.

FIG. 5A illustrates a cross-section of an exemplary beam splitter cube wafer 502, according to the present invention. FIG. 5B illustrates a top view of exemplary beam splitter cube wafer 502, according to the present invention. FIG. 5C illustrates a perspective view of exemplary beam splitter cube wafer 502, according to the present invention. FIG. 5A is a cross-section along line AA in FIG. 5B. Beam splitter cube wafer 502 comprises a plurality of wafer-level beam splitter cube pairs 504 and 508. Note that first beam splitter cube 504 corresponds to first beam splitter cube 104 in FIG. 4. First beam splitter cube 504 includes first dichroic filter 106F. Second beam splitter cube 508 corresponds to second beam splitter cube 108 in FIG. 4. Second beam splitter cube 508 includes second dichroic filter 110F. It is appreciated that FIGS. 5A-5C are schematic representations. Beam splitter cube wafer 502 has more beam splitter cube pairs 504-508 than what are shown in FIGS. 5A-5C. For example, to singulate wafer-level beam splitter cube pairs 504-508, beam splitter cube wafer 502 is diced repeatedly in orthogonal directions, e.g., lines B and C direction and lines E and F direction.

Refer back to FIG. 4, since prisms 104A, 104B, 108A, 108B, 112A, and 112B are made of the same material, prisms 104A and 108B may be formed as a single parallelepiped having a cross-section of parallelogram PQRS. No interface is between prisms 104A and 108B.

Figure 6:
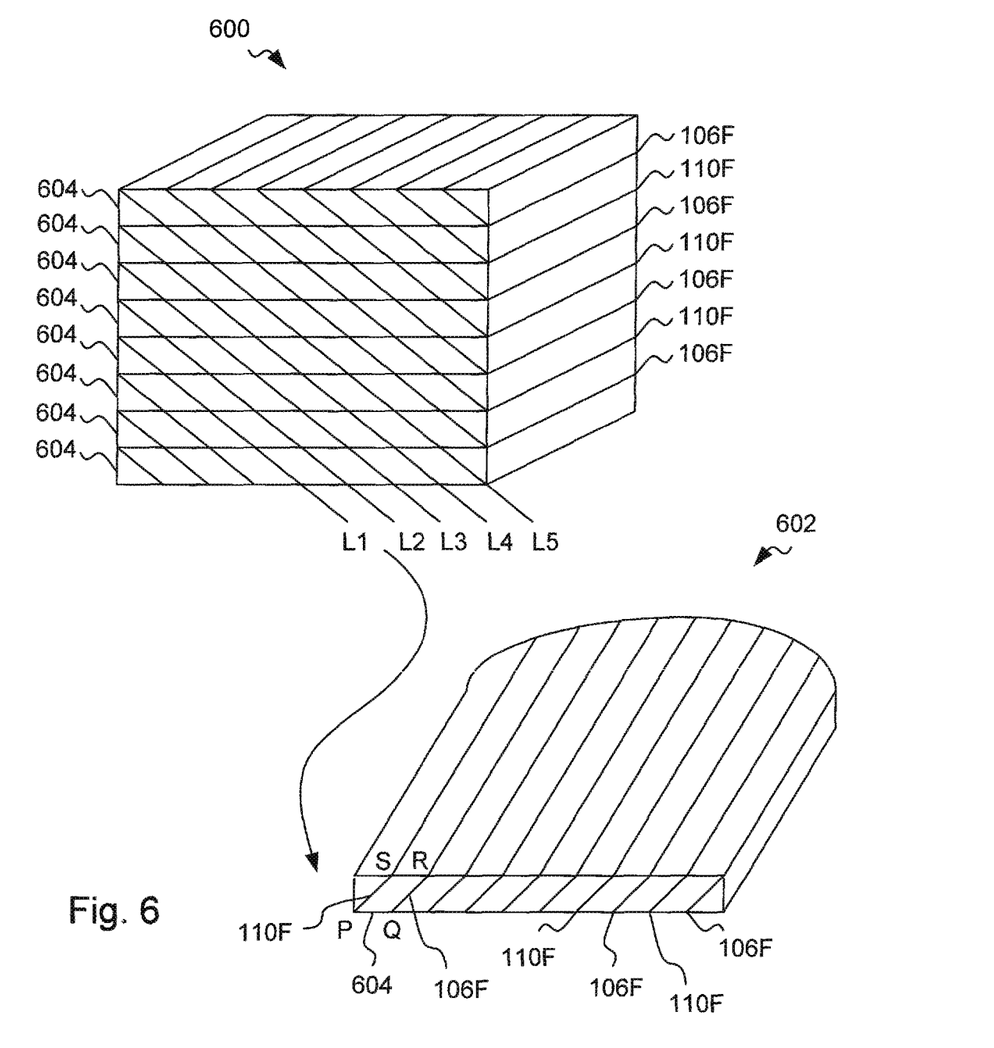
FIG. 6 illustrates a method for making beam splitter cube wafers, according to the present invention.

FIG. 6 illustrates a method for making beam splitter cube wafers, according to the present invention. A first planar dichroic filter 106F is disposed on a first planar substrate 604. First planar dichroic filter 106F may be a multi-layer interference filter. A second planar substrate 604 is disposed on the first planar dichroic filter 106F. A second planar dichroic filter 110F is disposed on the second planar substrate 604. Second planar dichroic filter 110F may be a multi-layer interference filter. A third planar substrate 604 is disposed on the second planar dichroic filter 110F, and another first planar dichroic filter 106F is disposed on the third planar substrate 604. The process is repeated to form a block 600 comprising a plurality of planar substrates 604 and a plurality of first dichroic filters 106F and a plurality of second dichroic filters 110F. First dichroic filters 106F and second dichroic filters 110F are alternately disposed on the top of planar substrates 604.

Block 600 is diced diagonally along lines L1, L2, L3, L4, . . . , to produce slices of beam splitter cube wafers 620 having alternately first dichroic filters 106F and second dichroic filters 110F. A beam splitter cube wafer 602 comprises a substrate layer 604 between second dichroic filter 110F and first dichroic filter 106F forming a cross-section of parallelogram PQRS. For example, beam splitter cube wafer 602 may be equivalent to beam splitter cube wafer 502 of FIG. 5C. However, no boundary is between first beam splitter cube 504 and second beam splitter cube 508 in beam splitter cube wafer 602. First dichroic filter 106F corresponds to first beam splitter cube 504, and second dichroic filter 110F corresponds to second beam splitter cube 508.

Figure 7A:
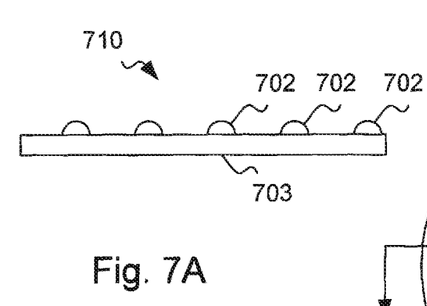
FIG. 7A illustrates a cross-section of an exemplary lens wafer, according to the present invention.
Figure 7B:
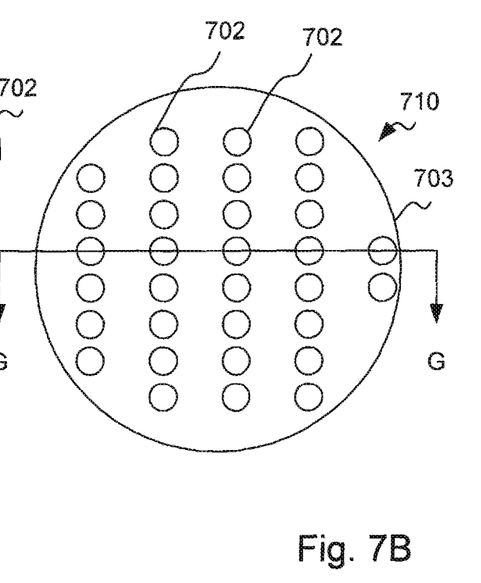
FIG. 7B illustrates a top view of the exemplary lens wafer, according to the present invention.
Figure 7C:
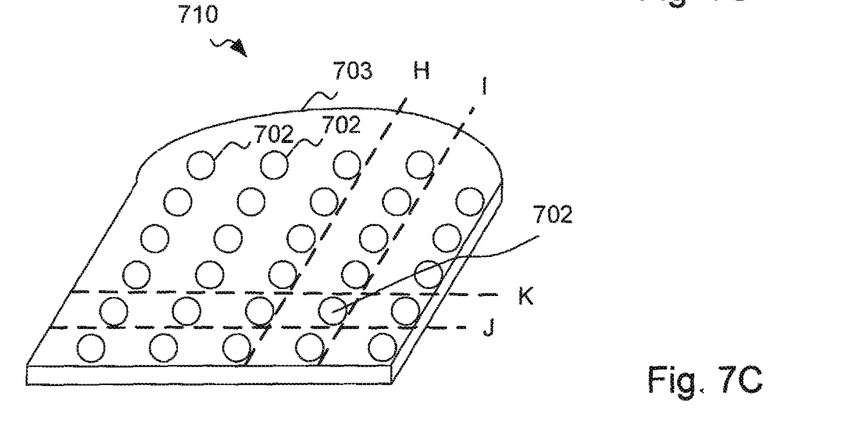
FIG. 7C illustrates a perspective view of the exemplary lens wafer, according to the present invention.

Imaging lens 102 may be a wafer-level lens. FIG. 7A illustrates a cross-section of an exemplary lens wafer 710, according to the present invention. FIG. 7B illustrates a top view of exemplary lens wafer 710, according to the present invention. FIG. 7C illustrates a perspective view of exemplary lens wafer 710, according to the present invention. FIG. 7A is a cross-section along line GG in FIG. 7B. Lens wafer 710 comprises a plurality of wafer-level lenses 702 replicated on a substrate 703. In accordance with FIG. 4, wafer-level lens 702 is aligned with first dichroic filter 106F. No wafer-level lens 702 is aligned with second dichroic filter 110F. It is appreciated that FIGS. 7A-7C are schematic representations. Lens wafer 710 has more wafer-level lenses 702 than what are shown in FIGS. 7A-7C. For example, to singulate wafer-level lenses 702 for matching with beam splitter cube pairs 504 and 508 of FIG. 5, lens wafer 710 is diced repeatedly in orthogonal directions, e.g., lines H and I direction and lines J and K direction. In this manner, each wafer-level lens 702 is aligned with first dichroic filter 106F or beam splitter cube 504 of FIG. 5. No wafer-level lens 702 is aligned with second dichroic filter 110F or beam splitter cube 508 of FIG. 5.

Figure 8:
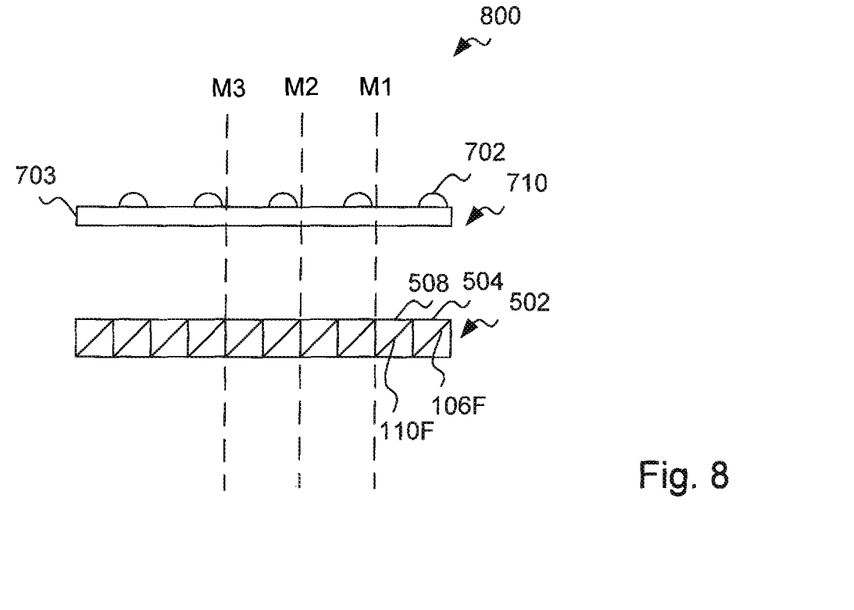
FIG. 8 illustrates an embodiment comprising a lens wafer disposed on a beam splitter cube wafer, according to the present invention.

FIG. 8 illustrates an embodiment 800 comprising lens wafer 710 disposed on beam splitter cube wafer 502 of FIG. 5, which is equivalent to beam splitter cube wafer 602 of FIG. 6, according to the present invention. Lens wafer 710 comprises substrate 703 and a plurality of wafer-level lenses 702 replicated on substrate 703. Each of wafer-level lenses 702 is aligned with each of first beam splitter cube 504 having first dichroic filter 106F. First beam splitter cube 504 corresponds to first beam splitter cube 104 of FIG. 4.

Figure 9:
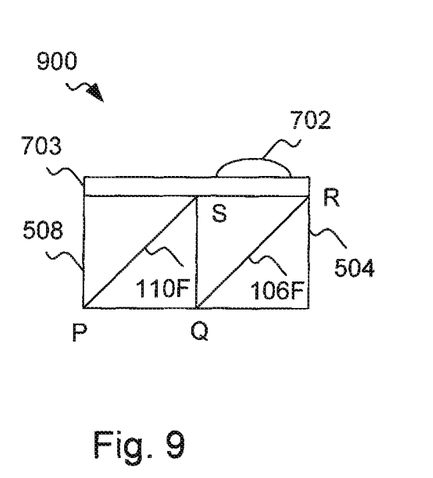
FIG. 9 illustrates an exemplary unit singulated from the embodiment of FIG. 8, according to the present invention.

FIG. 9 illustrates a unit 900 singulated from embodiment 800 of FIG. 8, according to the present invention. For example, embodiment 800 is diced along lines M1, M2, M3, . . . , (see FIG. 8) to form units 900. A singulated unit 900 comprises a first beam splitter cube 504 having a first dichroic filter 106F and a second beam splitter cube 508 having a second dichroic filter 110F. A wafer-level lens structure comprising a substrate 703 and a lens 702 is disposed on the pair of beam splitter cubes 504 and 508. Wafer-level lens 702 is aligned with first dichroic filter 106F of first beam splitter cube 504. No lens is on second beam splitter cube 508. FIG. 9 illustrates first beam splitter cube 504 and second beam splitter cube 508 corresponding to first beam splitter cube 104 and second beam splitter cube 108 of FIG. 4 for easy understanding and comparison.

Figure 9A:
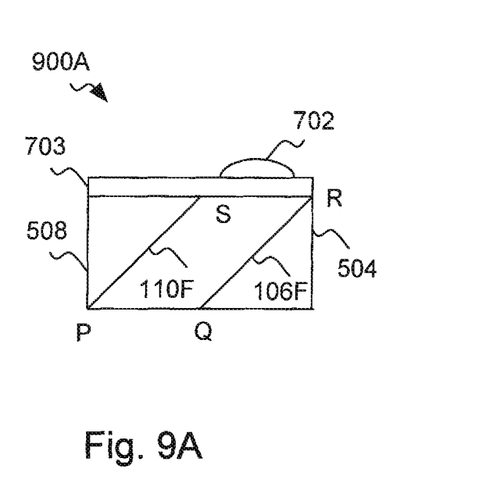
FIG. 9A illustrates another exemplary unit singulated from the embodiment of FIG. 8, according to the present invention.

FIG. 9A illustrates a singulated unit 900A similar to unit 900 of FIG. 9, according to the present invention. However, in the embodiment of FIG. 9A, beam splitter cubes 504 and 508 are made of same material and are made as a single part as shown in FIG. 6. There is no boundary between first beam splitter cube 504 and second beam splitter cube 508. Second dichroic filter 110F and first dichroic filter 106F form a cross-section of parallelogram PQRS. The pair of beam splitter cubes of FIG. 9A corresponds to beam splitter cubes of FIG. 6.

Figure 10:
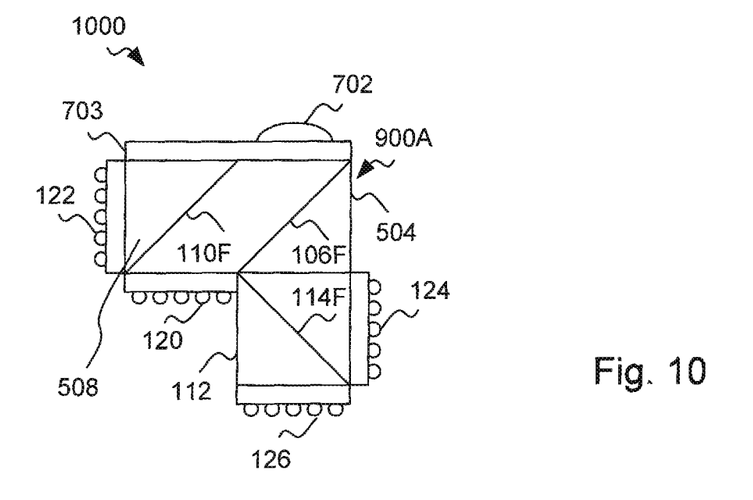
FIG. 10 illustrates an exemplary embodiment of imaging system having four image sensors comprising the singulated unit of FIG. 9A, according to the present invention.

FIG. 10 illustrate an embodiment 1000 comprising unit 900A of FIG. 9A mounted with a first image sensor 120, a second image sensor 122, and a third beam splitter cube 112, according to the present invention. Third beam splitter cube 112 includes a third dichroic filter 114F. Third beam splitter cube 112 is mounted with a third image sensor 124 and fourth image sensor 126. In an embodiment, the image sensor is mounted with a cover glass, in another embodiment, the image sensor is mounted without a cover glass.

For example, embodiment 1000 of FIG. 10 may be embodiment 400 of FIG. 4. Refer back to FIG. 4, first dichroic filter 106F splits incident light (not shown in FIG. 10) into light having wavelength bands $\lambda 1$ and $\lambda 2$ reflected toward second dichroic filter 110F, and light having wavelength bands $\lambda 3$ and $\lambda 4$ transmitted toward third dichroic filter 114F in third beam splitter cube 112. First dichroic filter 106F, second dichroic filter 110F, and third dichroic filter 114 are included in an integrated part comprising first beam splitter cube 504, second beam splitter cube 508, and third beam splitter cube 112. First dichroic filter 106F, second dichroic filter 110F, and third dichroic filter may be multi-layer interference filters.

It is appreciated that although FIG. 10 shows third dichroic filter 114F perpendicular to first dichroic filter 106F, third dichroic filter 114F may be parallel to first dichroic filer 106F by properly rotating third beam splitter cube 112. In this condition, third image sensor 124 is moved from the right side of third beam splitter cube 112 to the left side of third beam splitter cube 112.

Light reflected toward second dichroic filter 110F (not shown in FIG. 10) is split into light having wavelength band λ1 reflected toward first image sensor 120 and light having wavelength bands λ2 transmitted toward second image sensor 122. Light transmitted toward third dichroic filter 114F (not shown in FIG. 10) is split into light having wavelength band λ3 reflected toward third image sensor 124 and light having wavelength bands λ4 transmitted toward fourth sensor 126.

In this manner, incident light (not shown in FIG. 10) is split into: light having first wavelength band λ1 arriving at and detected by first image sensor 120, light having second wavelength band λ2 arriving at and detected by second image sensor 122, light having third wavelength band λ3 arriving at and detected by third image sensor 124, and light having fourth wavelength band λ4 arriving at and detected by fourth image sensor 126. Lengths of light paths from imaging lens 702 to first image sensor 120, second image sensor 122, third image sensor 124, and fourth image sensor 126 are the same.

Wafer-level lens 702 forms a 2D image of first wavelength band λ1 on first image sensor 120, a 2D image of second wavelength band λ2 on second image sensor 122, a 2D image of third wavelength band λ3 on third image sensor 124, and a 2D image of fourth wavelength band λ4 on fourth image sensor 126.

In an embodiment, first wavelength band λ1, second wavelength band λ2, third wavelength band λ3, and fourth wavelength band λ4 correspond to blue, green, red, and infrared, respectively. In another embodiment, first wavelength band λ1, second wavelength band λ2, third wavelength band λ3, and fourth wavelength band λ4 correspond to blue, green, red, and yellow, respectively. In yet another embodiment, first wavelength band λ1, second wavelength band λ2, third wavelength band λ3, and fourth wavelength band λ4 may correspond to any colors.

Figure 11:
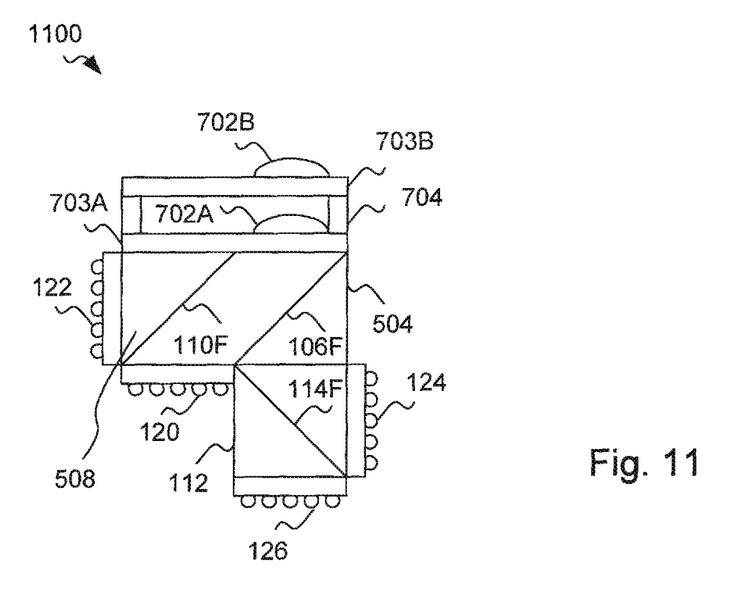
FIG. 11 illustrates another exemplary embodiment of imaging system having four image sensors comprising the singulated unit of FIG. 9A, according to the present invention.

FIG. 11 illustrates an embodiment 1100 similar to embodiment 1000 of FIG. 10, according to the present invention. Embodiment 1100 is different from embodiment 1000 that wafer-level lens 702 and substrate 703 of FIG. 10 are replaced by a wafer-level lens structure comprising two wafer-lenses 702A and 702B, and two substrates 703A and 703B. Wafer-level lens 702B and substrate 703B are disposed on wafer-level lens 702A and substrate 703A using spacers 704. It is appreciated that the wafer-level lens structure may comprise more than two wafer-level lenses and/or two substrates. The wafer-level lens structure may be made in wafer form and disposed on the beam splitter cube wafer prior to the singulation of the pair of beam splitter cubes. The wafer-level lens structure is equivalent to imaging lens 102 of FIGS. 1-4.

In an embodiment, at least one image sensor is sensitive to infrared light for night vision or gesture recognition. In an embodiment, an IR image sensor comprises TOF pixels for detecting distance of objects in the scene to the image sensor for 3D imaging. TOF pixels are capable of detecting a distance from a target to the image sensor or the pixel. In an embodiment, the image sensors have no color filters covering the light sensitive pixels.

An imaging system having four image sensors is disclosed. The imaging system comprises a first dichroic filter, a second dichroic filter, and a third dichroic filter. The first dichroic filter reflects light having a first wavelength band and a second wavelength band toward a second dichroic filter, and transmits light having a third wavelength band and a fourth wavelength band toward the third dichroic filter. The second dichroic filter reflects light having the first wavelength band toward the first image sensor, and transmits light having the second wavelength band toward the second image sensor. The third dichroic filter reflects light having the third wavelength band toward the third image sensor, and transmits light having the fourth wavelength band toward the fourth image sensor. The first dichroic filter, the second dichroic filter, and the third dichroic filter are included in an integrated part.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An imaging system comprising:
an imaging lens;
a first dichroic filter, a second dichroic filter, and a third dichroic filter; and
a first image sensor, a second image sensor, a third image sensor, and a fourth image sensor;
wherein the first dichroic filter reflects light having a first wavelength band and a second wavelength band toward a second dichroic filter, and transmits light having a third wavelength band and a fourth wavelength band toward the third dichroic filter,
the second dichroic filter reflects light having the first wavelength band toward the first image sensor, and transmits light having the second wavelength band toward the second image sensor, and
the third dichroic filter reflectes light having the third wavelength band toward the third image sensor, and transmits light having the fourth wavelength band toward the fourth image sensor;
wherein the imaging lens forms a 2D image of the first wavelength band on the first image sensor, a 2D image of the second wavelength band on the second image sensor, a 2D image of the third wavelength band on the third image sensor, and a 2D image of the fourth wavelength band on the fourth image sensor; and
wherein the first dichroic filter, the second dichroic filter, and the third dichroic filter are included in an integrated part.

2. The imaging system of claim 1, wherein the integrated part comprises a first beam splitter cube having the first dichroic filter, a second beam splitter cube having the second dichroic filter, and a third beam splitter cube having the third dichroic filter.

3. The imaging system of claim 2, wherein the second dichroic filter is perpendicular to the first dichroic filter and the third dichroic filter is perpendicular to the first dichroic filter.

4. The imaging system of claim 2, wherein the second dichoric filter is parallel to the first dichroic filter.

5. The imaging system of claim 4, wherein the first beam splitter cube is integrated with the second beam splitter cube to form a single part having the first dichroic filter and the second dichroic filter.

6. The imaging system of claim 1, wherein the integrated part comprises a first prism, a second prism, a third prism, and a fourth prism, the first prism and the second prism have the same size, the third prism and the fourth prism have a size one half of the first prism.

7. The imaging system of claim 6, wherein the first dichroic filter is disposed on an interface of the first prism and the second prism, the second dichroic filter is disposed on an interface of the first prism and the third prism, and the third dichroic filter is disposed on an interface of the second prism and the fourth prism.

8. The imaging system of claim 1, wherein the integrated part comprises a first prism, a second prism, and a third prism, the first prism and the second prism have the same size, the third prism has a size double the size of the first prism.

9. The imaging system of claim 8, wherein the first dichroic filter is disposed on an interface of the first prism and the second prism, the second dichroic filter is disposed on an interface of the first prism and the third prism, and the third dichroic filter is disposed on an interface of the second prism and the third prism.

10. The imaging system of claim 1, wherein the imaging lens is a wafer-level lens.

11. The imaging system of claim 1, wherein the first image sensor, the second image sensor, the third image sensor, and the fourth image sensor have no color filter array covering light sensitive pixels.

12. The imaging system of claim 1, wherein the first wavelength band corresponds to blue color, the second wavelength band corresponds to green color, and the third wavelength band corresponds to red color.

13. The imaging system of claim 12, wherein the fourth wavelength band corresponds to yellow color.

14. The imaging system of claim 12, wherein the fourth wavelength band corresponds to infrared.

15. The imaging system of claim 14, wherein the fourth image sensor comprises time-of-flight pixels capable of detecting a distance from a target to the fourth image sensor.

* * * * *